Jan. 27, 1970     D. H. WEDEKIND     3,491,482
DRIVE OVER GATE

Filed Sept. 10, 1968     2 Sheets-Sheet 1

INVENTOR
DONALD H. WEDEKIND

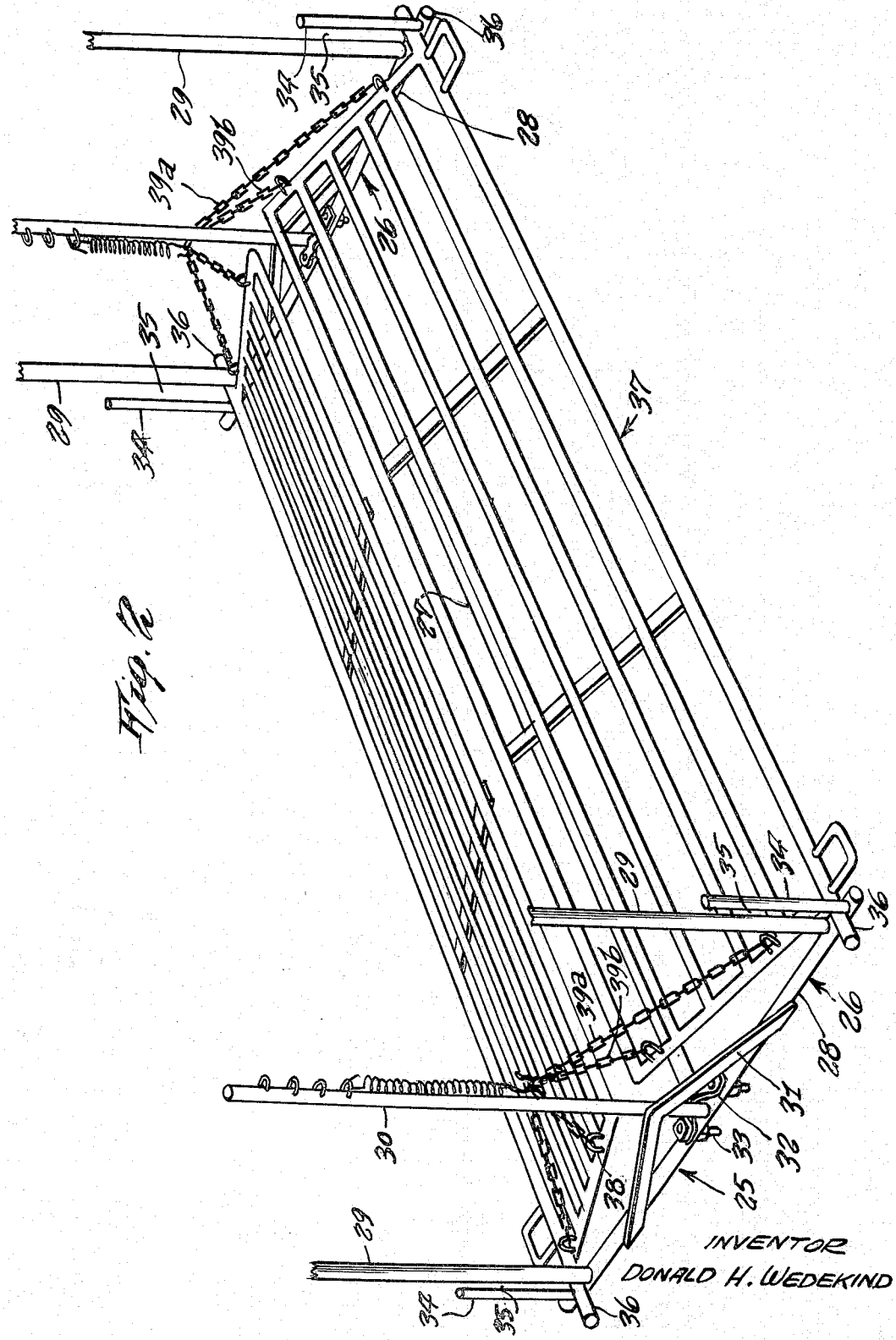

United States Patent Office 3,491,482
Patented Jan. 27, 1970

3,491,482
DRIVE OVER GATE
Donald H. Wedekind, Rte. 2, Lindsay, Nebr. 68644
Filed Sept. 10, 1968, Ser. No. 758,767
Int. Cl. E06b 11/00
U.S. Cl. 49—131
5 Claims

ABSTRACT OF THE DISCLOSURE

A drive-over type livestock gate has a pair of gate members disposed between end sub-frames, each gate member having at least one edge capable of pivotal movement relative to the other edge about generally horizontal axes. Support means, including tension coil springs, extend between the upper portions of the sub-frames and the gate members to resiliently and adjustably support the gate members at selected heights and in selected orientations. The gate members are thus resiliently and adjustably supportable at various heights and in various orientations, and may be pivoted to substantially upstanding positions.

---

This invention relates generally to livestock gates.

A principal object of the present invention is to provide a livestock gate which can be driven over by an automotive vehicle without fear of breakage of the gate.

Yet another object is to provide a livestock gate which will confine animals such as hogs, cattle, and the like while at the same time not confining a vehicle.

Yet another object is to provide a livsetock gate which will flatten into a horizontal position while a vehicle travels thereacross, but which will immediately raise into a lifted position as soon as the vehicle has cleared the gate, thus instantly again confining the animals from getting through the gate; it being known that cattle and hogs may try to run through a gate as soon as the same is made open.

Yet another object is to provide a livestock gate which can be adjustably set at many different heights and orientations.

Yet another object is to provide a livestock gate which can be adjustably set up vertically so that even an automotive vehicle may be confined from passing therethrough.

Yet another object is to provide a livestock gate which is adaptable to have an alarm unit mounted thereupon so to make a loud noise when a vehicle rides thereacross.

Other objects are to provide a drive over gate which is simple in design, inexpensive to manufacture, rugged in construction, easy to use and efficient in operation.

In achieving these and other objects, a drive-over gate in accordance with the invention generally includes a frame assembly comprising a pair of end sub-frames each comprising a base member and an upright center post secured thereto, a pair of gate members disposed between the sub-frames and each having at least one edge capable of pivotal movement relative to the other edge about generally horizontal axes, support means for resiliently and adjustably supporting the gate members at selected heights and in selected orientations, the support means including tension coil springs adjustably secured to an upper portion of each center post and coupled to and supporting the gate members at least in part, whereby the gate members may be resiliently and adjustably supported at various heights and in various orientations and may be pivoted to substantially upstanding positions. Preferably each edge of each gate member is substantially free for at least some limited movement in up-and-down directions, and upwardly extending members of the sub-frames are provided adjacent the ends of the base members to cooperate with portions of the outer edges of the gate members, whereby the upwardly extending members guide the movements of the outer edges of the gate members during any upward and downward movement thereof.

These and other objects will be readily evident upon a study of the following specification and the accompanying drawing wherein:

FIGURE 2 is a perspective view of a modified form thereof.

Figure 1:
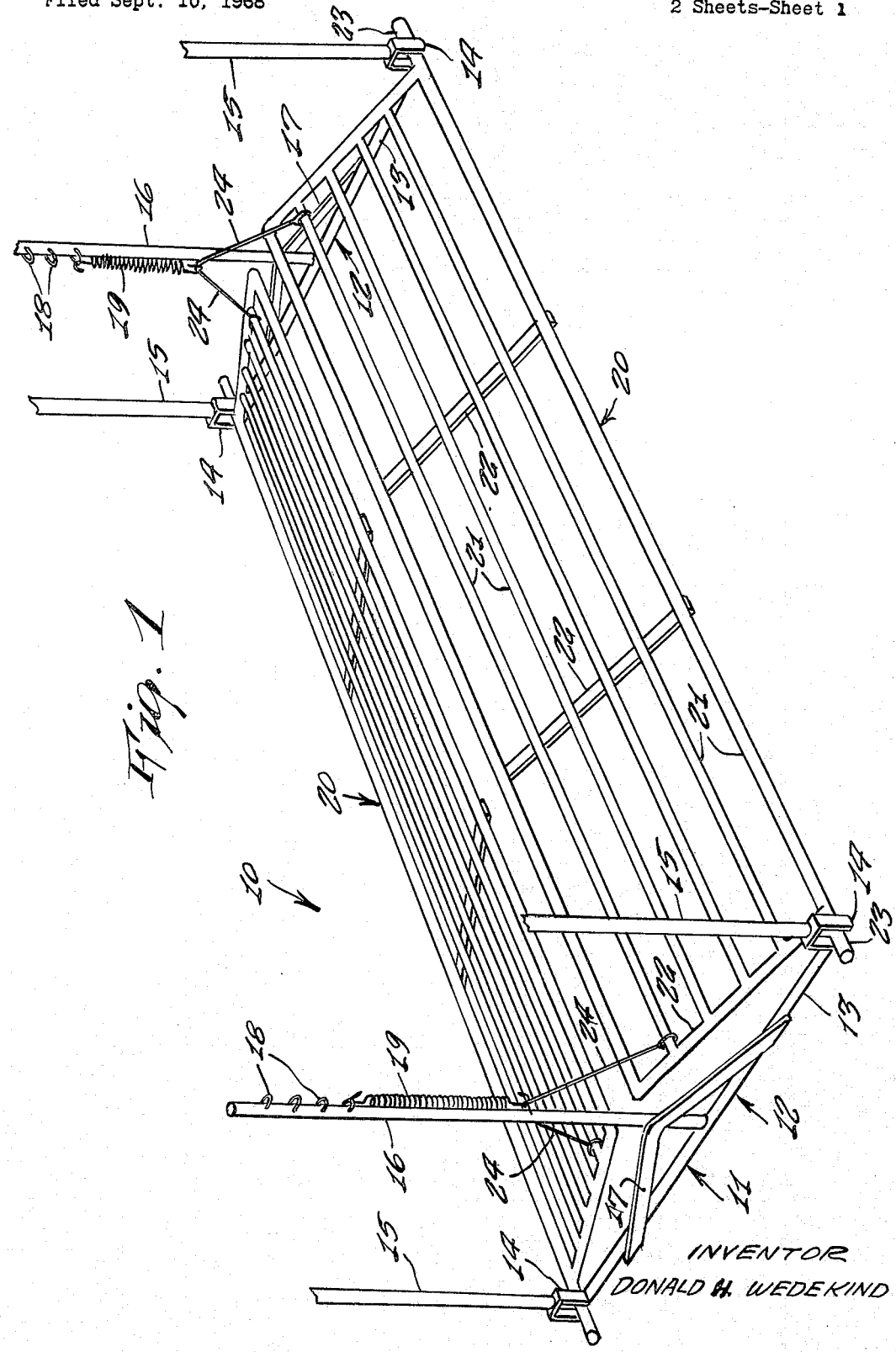
FIGURE 1 is a perspective view of one form of the invention.

Referring now to the drawing in detail, the reference numeral 10 represents a drive over gate according to the present invention wherein, as shown in FIGURE 1, there is a stationary frame 11 comprised of sub-frames 12 at each longitudinal end which may be interconnected to form a unitary frame 11; each sub-frame 12 including a horizontal transverse bar 13 which is secured at its opposite ends to an inverted U-shaped bracket 14 from each of where there extends upwardly an end post 15. An upwardly extending center post 16 is centrally secured to the bar 13 and is further strengthened against stress by a brace 17. A plurality of eye bolts 18 are secured in spaced apart relation along the upper portion of the center post 16; one end of a tension coil spring 19 being attached selectively to one of the eye bolts.

A pair of pivotable gate members 20 are each comprised of longitudinal bars 21 and transverse bars 22 secured into a rectangular unit; each gate member 20 having sidewardly extending bar ends 23 which are receivable under the U-shaped brackets 14 and about which the gate member is pivotable. The opposite end of the gate member 20 is secured to a cable 24 which is attached to the opposite end of the tension coil spring 19.

In operative use, when an automobile or truck is driven across the gate, the gate members, normally supported at an upwardly inclined angle by the spring 19, are now pivoted downwardly against the ground due to the vehicle weight. As soon as the vehicle rides thereacross, the gate members again pivot upwardly again to confine the livestock.

In FIGURE 2, a modified form of the invention is shown to comprise a generally equivalent structure with slightly modified details. A frame 25 includes opposite end sub-frames 26 secured together by a central cross beam 27. Each sub-frame includes a transverse bar 28 having upstanding end parts 29 and center post 30 secured by brace 31. A bracket 32 and bolts 33 secure the cross beam to each end sub-frame. In the present structure, each end sub-frame includes an upwardly extending bar 34 secured at its lower end to the transverse bar 28; each bar 34 being spaced from one of the end posts 29 so to form a crotch 35 therebetween into which extending bar ends 36 may be dropped, and about which each gate member 37 is pivotable. Each gate member 37 is of like construction as the gate members 20, except that each gate member 37 includes U-shaped hooks 38 near each of its four corners, and one end of a chain 39a or 39b is attached to each hook. The opposite end of each chain is adjustably attached to the lower end of the tension coil spring 19 which is similar as above described.

In this form of the invention, each gate member may be raised at its outer edge a selected distance above the ground if desired by adjusting the length of chains 39a.

It is to be noted that the gate members in both forms of the invention may be angularly adjusted between a horizontal and vertical plane by securing the upper end of the springs 19 in any one of the eye bolts 18, as desired.

A concrete slab may be located below the drive over gate if so desired.

While various changes may be made in the detail construction, it is understood that such changes will be within the spirit and scope of the present invention.

Having thus set forth and disclosed the nature of this invention, what is claimed is:

1. In a drive over gate, a frame assembly comprising a pair of end sub-frames each comprising a base member and an upright center post secured thereto, securement means between said subframes, a pair of gate members disposed between said sub-frames and each having at least one edge capable of pivotal movement relative to the other edge about generally horizontal axes, support means for resiliently and adjustably supporting said gate members at selected heights and in selected orientations, said support means including tension coil springs adjustably secured to an upper portion of each center post and coupled to and supporting said gate members at least in part, each edge of said gate members being substantially free for at least limited movement in up-and-down directions, whereby said gate members may be resiliently and adjustably supported at various heights and in various orientations and may be moved to substantially upstanding positions, upwardly extending members adjacent the ends of said base members, and the outer edges of said gate members including portions cooperating with said upwardly extending members, whereby the upwardly extending members at least partially guide the movements of the outer edges of the gate members during at least part of any upward and downward movement thereof.

2. Apparatus as claimed in claim 1 wherein each said gate member comprises a rectangular unit having laterally extending bar ends pivotally supported in pivot support means at each end of said base member, said pivot support means comprising said upwardly extending members, and said laterally extending bar ends comprising the portions cooperating with the upwardly extending members.

3. Apparatus as claimed in claim 1 wherein said gate members are coupled to said springs by chains adjustably connected between each corner area of each gate member and one of said springs.

4. Apparatus as claimed in claim 1 wherein a flexible connecting member is connected between the lower end of each tension spring and the pivotal edge of each gate member.

5. Apparatus as claimed in claim 1 wherein each edge of each gate member is free for substantial movement in up and down directions, and each gate member is adjustably connected at its corner areas to one of said tension coil springs by flexible connecting members, whereby the supported height of each edge of a gate member can be varied relative to the other edge, and either edge can be moved pivotally relative to the other edge.

References Cited

UNITED STATES PATENTS

| | | | |
|---|---|---|---|
| 1,247,817 | 11/1917 | Gilkey | 49—131 |
| 1,714,820 | 5/1929 | Rounsborg et al. | 49—131 |
| 2,024,063 | 12/1935 | Roper | 49—131 |
| 3,256,637 | 6/1966 | Torrey | 49—131 X |
| 3,296,741 | 1/1967 | Lubmann | 49—131 |

DENNIS L. TAYLOR, Primary Examiner